United States Patent
Muramoto

(10) Patent No.: US 9,697,272 B2
(45) Date of Patent: Jul. 4, 2017

(54) DATA REFERENCE ASSISTANT APPARATUS, AND DATA REFERENCE ASSISTANT METHOD

(71) Applicant: FUJITSU LIMITED, Kawasaki-shi, Kanagawa (JP)

(72) Inventor: Kazunao Muramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

(21) Appl. No.: 13/950,766

(22) Filed: Jul. 25, 2013

(65) Prior Publication Data

US 2013/0311465 A1 Nov. 21, 2013

Related U.S. Application Data

(63) Continuation of application No. PCT/JP2011/051460, filed on Jan. 26, 2011.

(51) Int. Cl.
G06F 17/30 (2006.01)

(52) U.S. Cl.
CPC .. *G06F 17/30595* (2013.01); *G06F 17/30392* (2013.01)

(58) Field of Classification Search
CPC .......................... G06F 17/30864; G06Q 10/10
USPC ......................................................... 707/736
See application file for complete search history.

(56) References Cited

U.S. PATENT DOCUMENTS

| 2006/0178954 A1* | 8/2006 | Thukral | G06Q 10/087 705/28 |
| 2009/0077582 A1* | 3/2009 | Ahn | G11B 27/034 725/39 |
| 2010/0115100 A1* | 5/2010 | Tubman | G06F 17/30545 709/227 |

(Continued)

FOREIGN PATENT DOCUMENTS

| EP | 2182448 | 5/2010 |
| JP | 2-73424 | 3/1990 |

(Continued)

OTHER PUBLICATIONS

International Search Report mailed Apr. 5, 2011 in corresponding International Application No. PCT/JP2011/051460.

(Continued)

*Primary Examiner* — Kris Mackes
*Assistant Examiner* — Allen Lin
(74) *Attorney, Agent, or Firm* — Staas & Halsey LLP

(57) ABSTRACT

A data reference assistant apparatus includes a generator configured to generate data-type relation information between at least one of combinations of two data types from a database that manages component information and location relation information, the component information indicating components of data that include a data type of data, and the location relation information indicating a relational destination or a relational source between two or more of the data, for each of the data, and a recording unit configured to connect between two or more connectable combinations of (Continued)

| CI TYPE | DOMAIN ID | DOMAIN NAME | NETWORK ADDRESS |
|---|---|---|---|
| ServerDomain | sd1 | domain1 | 10.124.144.0 |
| | sd2 | domain2 | 192.168.1.0 |

41

| CI TYPE | SERVER ID | HOST NAME | IP ADDRESS | OS TYPE | ATTENDING DOMAIN ID | ADMINISTRATOR ID |
|---|---|---|---|---|---|---|
| Server | svr1 | SERVER A | 10.124.144.101 | wwww Server 2003 xx | sd1 | user1 |
| | svr2 | SERVER B | 10.124.144.102 | SSS 10 | sd1 | user2 |
| | svr3 | SERVER C | 10.124.144.103 | wwww Server 2003 xx | sd1 | ... |
| | svr4 | SERVER D | 192.168.1.1 | wwww Server 2003 xx | sd2 | ... |

42

| CI TYPE | SOFTWARE ID | PRODUCT NAME | VERSION | INSTALLATION DESTINATION SERVER ID |
|---|---|---|---|---|
| Software | is1 | SOFTWARE A1 | 1.0.0 | svr1 |
| | is2 | SOFTWARE A2 | 1.0.0 | svr1 |
| | is3 | SOFTWARE B1 | 1.0.0 | svr2 |

43

| CI TYPE | USER ID | NAME | ... |
|---|---|---|---|
| User | user1 | ... | ... |
| | user2 | ... | ... |
| | : | : | : |

44 the data-type relation information based on a matching result between the data type of the relational destination and the data type of the relational source, and to store the connected result in a storage unit as reference relation information for limiting a reference range of the database.

12 Claims, 16 Drawing Sheets

(56) References Cited

U.S. PATENT DOCUMENTS

| | | |
|---|---|---|
| 2011/0078218 A1* | 3/2011 | Hirai .................. G06F 11/3476 707/812 |
| 2011/0225160 A1 | 9/2011 | Sonoda |
| 2012/0011172 A1 | 1/2012 | Wada et al. |
| 2012/0016837 A1 | 1/2012 | Matsuda et al. |

FOREIGN PATENT DOCUMENTS

| | | |
|---|---|---|
| WO | WO 2010/064317 | 6/2010 |
| WO | WO 2010/113290 | 10/2010 |
| WO | WO 2010/116475 | 10/2010 |

OTHER PUBLICATIONS

Patent Abstracts of Japan, Publication No. 02-073424, Published Mar. 13, 1990.

* cited by examiner

FIG.5

| CI TYPE | DOMAIN ID | DOMAIN NAME | NETWORK ADDRESS |
|---|---|---|---|
| ServerDomain | sd1 | domain1 | 10.124.144.0 |
| | sd2 | domain2 | 192.168.1.0 |

41

| CI TYPE | SERVER ID | HOST NAME | IP ADDRESS | OS TYPE | ATTENDING DOMAIN ID | ADMINISTRATOR ID |
|---|---|---|---|---|---|---|
| Server | svr1 | SERVER A | 10.124.144.101 | wwww Server 2003 xx | sd1 | user1 |
| | svr2 | SERVER B | 10.124.144.102 | SSS 10 | sd1 | user2 |
| | svr3 | SERVER C | 10.124.144.103 | wwww Server 2003 xx | sd1 | ... |
| | svr4 | SERVER D | 192.168.1.1 | wwww Server 2003 xx | sd2 | ... |

42

| CI TYPE | SOFTWARE ID | PRODUCT NAME | VERSION | INSTALLATION DESTINATION SERVER ID |
|---|---|---|---|---|
| Software | is1 | SOFTWARE A1 | 1.0.0 | svr1 |
| | is2 | SOFTWARE A2 | 1.0.0 | svr1 |
| | is3 | SOFTWARE B1 | 1.0.0 | svr2 |

43

| CI TYPE | USER ID | NAME |
|---|---|---|
| User | user1 | ... |
| | user2 | ... |
| | ... | ... |

| STRUCTURAL MODEL NAME | RELATION ROUTE |
|---|---|
| model-1 | ServerDomain→Server |
| model-2 | Server→Software |
| model-3 | User→Server |

FIG.9

| REFERENCE MODEL NAME | STRUCTURAL MODEL NAME (SOURCE) | APPEARING POSITION (SOURCE) | STRUCTURAL MODEL NAME (DESTINATION) | APPEARING POSITION (DESTINATION) |
|---|---|---|---|---|
| view-1 | — | — | model-1 | 1 |
| view-2 | — | — | model-2 | 1 |
| view-3 | model-1 | 2 | model-2 | 1 |
| view-4 | model-3 | 2 | model-2 | 1 |
| view-5 | — | — | model-3 | 1 |

17

| REFERENCE MODEL NAME | STRUCTURAL MODEL NAME (SOURCE) | CI APPEARING POSITION (SOURCE) | STRUCTURAL MODEL NAME (DESTINATION) | CI APPEARING POSITION (DESTINATION) |
|---|---|---|---|---|
| V1 | — | — | M1 | 1 |
| V2 | M2 | 2 | M1 | 1 |
| V3 | M2 | 2 | M1 | 1 |
| V3 | M3 | 3 | M2 | 2 |
| V4 | M2 | 2 | M1 | 1 |
| V4 | M3 | 3 | M2 | 2 |
| V4 | M4 | 4 | M3 | 3 |

FIG.12

| REFERENCE MODEL NAME | RELATION ROUTE |
|---|---|
| view-1 | ServerDomain→Server |
| view-2 | Sever→Software |
| view-3 | ServerDomain→Server→Software |
| view-4 | User→Server→Software |
| view-5 | User→Server |
| view-6 | (ServerDomain ‖ User)→Server |
| view-7 | (ServerDomain ‖ User)→Server→Software |

LIST OF REFERENCE PATTERNS — 510

511:
DOMAIN > SERVER
DOMAIN > SERVER > SOFTWARE
(DOMAIN || USER) > SERVER
(DOMAIN || USER) > SERVER > SOFTWARE

512: OK    CANCEL

| CI TYPE | DISPLAY NAME |
|---|---|
| ServerDomain | DOMAIN |
| Server | SERVER |
| Network | NETWORK |
| Storage | STORAGE |
| Software | SOFTWARE |
| User | USER |
| ServerPerformance | PERFORMANCE INFORMATION |
| ... | ... |

DATA REFERENCE ASSISTANT APPARATUS, AND DATA REFERENCE ASSISTANT METHOD

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2011/051460 filed on Jan. 26, 2011, the entire contents of which are incorporated herein by reference.

FIELD

The disclosures herein are generally related to a data reference assistant apparatus, and a data data reference assistant method.

BACKGROUND

A configuration management database (CMDB) is developed for managing configuration information related to all the components of an information system. Each of the components of an information technology (IT) system is managed by the CMDB as an object called a configuration item (CI). The CMDB is normally constructed by collecting or integrating data (corresponding to the CIs) managed in various types of management data repositories (MDRs).

The CMDB also manages relationships between the CIs. The "relationships" in this context may include various types of relationships such as dependence relationships or accessibility relationships in the IT system. Hence, a user may be able to identify relationships of all the components in the entire IT system by referring to management information of the CMDB.

Note that such CIs and the relationships may either be registered by a plurality of users or by employing a plurality of the MDRs as sources, based on the operations of the CMDB. Accordingly, a plurality of the relationships may be generated corresponding to an identical CI. As a result, an enormous amount of the management information may be registered in the CMDB. Hence, when a user refers to the management information of the CMDB as it is, the relationships between the CIs may be extremely complicated.

Further, even though the relationships of the identical CIs are referred to, types or ranges of the relationships that the users wish to refer to may vary with the respective users' interests. For example, some user may wish to limit referral to a relationship between a server and software installed in the server and refer to such a relationship in detail, whereas another user may wish to limit referral to relationships between domains of a network and servers belonging to the respective domains and refer to such relationships in detail.

Hence, a related art technology (e.g., Japanese Laid-open Patent Publication No. 2-073424, hereinafter referred to as "Patent Document 1") proposes creating information for limiting the reference range of the management information of the CMDB (hereinafter called "filter information").

RELATED ART DOCUMENTS

Patent Document

Patent Document 1: Japanese Laid-open Patent Publication No. 2-073424

However, the filter information is, in general, manually created by users. That is, each of the users creates the filter information by selecting data (i.e., CIs and their relationships) belonging to the user's desired reference range every time the user wishes to refer to the desired relationships in the management information of the CMDB.

As noted earlier, an enormous amount of data (i.e., CIs and their relationships) may be registered in the CMDB. Hence, it may be an extremely complicated task for a user to select data of the user's interest from the enormous amount of data.

According to an aspect of an embodiment, there is provided a data reference assistant apparatus that includes a generator configured to generate data-type relation information between at least one of combinations of two data types from a database that manages component information and location relation information, the component information indicating components of data that include a data type of data, and the location relation information indicating a relational destination or a relational source between two or more of the data, for each of the data; and a recording unit configured to connect between two or more connectable combinations of the data-type relation information based on a matching result between the data type of the relational destination and the data type of the relational source, and to store the connected result in a storage unit as reference relation information for limiting a reference range of the database.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

Other objects, features, and advantages of the present invention will become more apparent from the following detailed description when read in conjunction with the accompanying drawings.

BRIEF DESCRIPTION OF DRAWINGS

FIG. 5 is a diagram illustrating a configuration example of a management data repository (MDR) registered in a configuration management database (CMDB);

FIG. 7 is a diagram illustrating a configuration example of a structural model storage unit;

FIG. 9 is a diagram illustrating a configuration example of a reference model generation table;

FIG. 12 is a diagram illustrating a configuration example of a reference model storage unit;

DESCRIPTION OF EMBODIMENTS

SUMMARY

Accordingly, it is an object in one aspect of the embodiment to provide a data reference assistant apparatus, and a data reference assistant method that may facilitate a task to limit referral to a desired reference range of a database.

Figure 1:
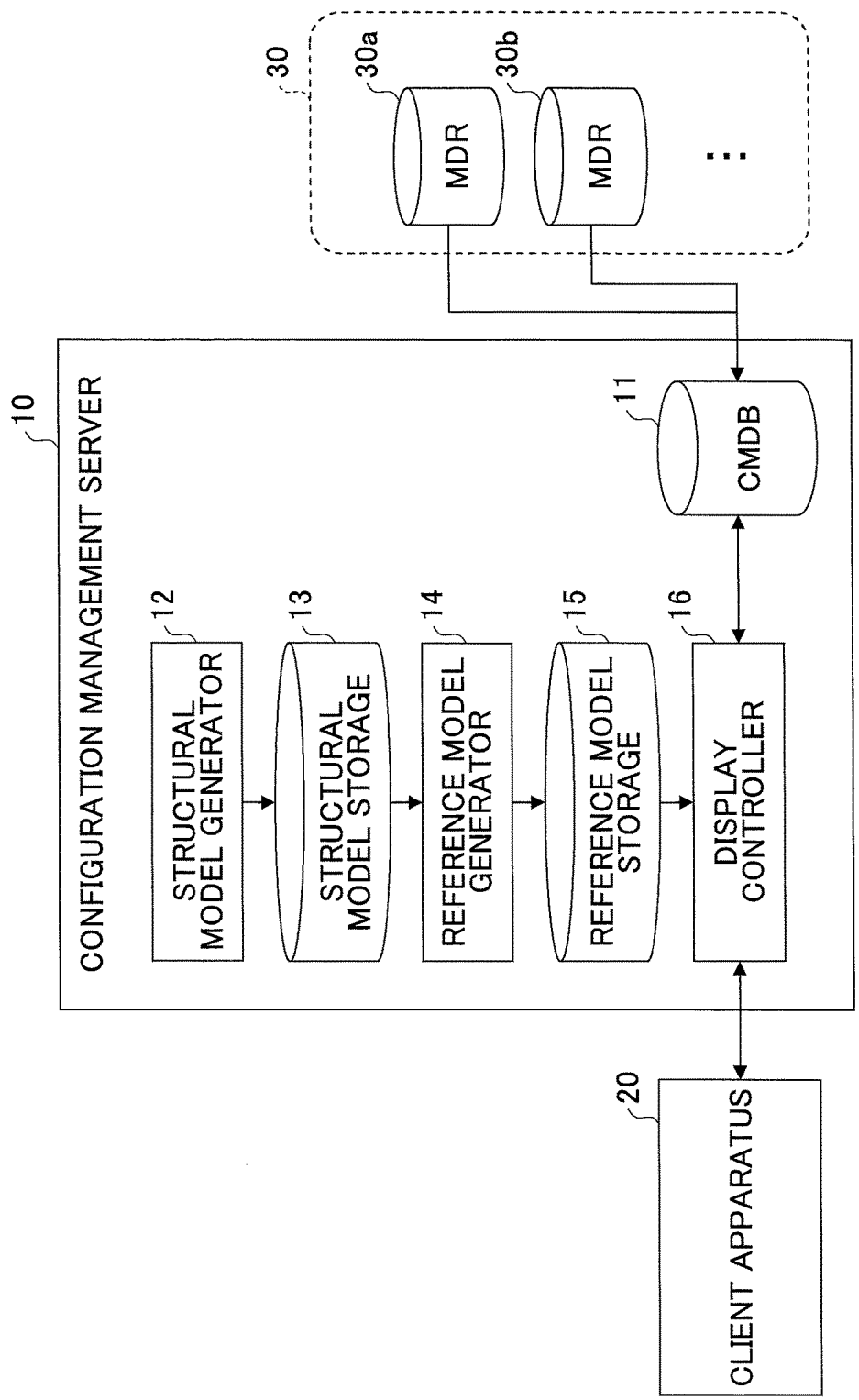
FIG. 1 is a diagram illustrating a configuration example of a configuration management system in one embodiment.

Preferred embodiments of the present invention will be described with reference to the accompanying drawings. FIG. 1 is a diagram illustrating a configuration example of a configuration management system in one embodiment. As illustrated in FIG. 1, the configuration management system includes a configuration management server 10 and a client apparatus 20, which are connected in communications with each other via a local area network or a wide area network such as the Internet, regardless of wired or wireless connection.

The client apparatus 20 is a computer such as a personal computer (PC), or the like, utilized by a user when the user desires to browse or refer to a configuration management database (CMDB) 11. The client apparatus 20 may be a mobile terminal such as a personal digital assistance (PDA) or a mobile phone.

The configuration management server 10 may be an example of a data reference assistant apparatus. The configuration management server 10 includes the CMDB 11, a structural model generator 12, a structural model storage unit 13, a reference model generator 14, a reference model storage unit 15, and a display controller 16. These components may be implemented by causing the CPU 10 to execute one or more programs installed on the mobile terminal 10.

The CMDB 11 serves as a so-called configuration management database (CMDB). That is, the CMDB 11 serves as a database configured to store (manage) configuration information associated with the IT system utilizing an auxiliary storage device of the structural management server 10. The configuration information includes configuration items (CIs) and relationships between the CIs. Each of the configuration items (CIs) indicates a set of data serving as a corresponding one of components of the information system. What type of the CIs are subject to management may depend on the operation (operation direction) of the CMDB. The data managed by the CMDB 11 are collected from various (management data repositories) MDRs 30. Each of the MDRs 30 serves as a so-called management data repository. Each of the MDRs 30 may be a database serving as a source (i.e., a source of information) of the CMDB 11. For example, the MDR 30 may manage attribute information of data subject to management and relationships between data in a specific IT system. Sets of the data are registered as respective CIs, and the relationship between the sets of data is registered as a relationship between the CIs. Hence, the CMDB 11 may serve as a database that integrates a plurality of the MDRs 30.

Note that the MDRs 30 may be included within the configuration server 10 or a computer differing from the configuration server 10. Alternatively, the CMDB 11 may be implemented in another computer connected to the configuration management server 10 via the network.

The structural model generator 12 is configured to extract relational information between the CI types from the CMDB 11, and generate a structural model based on the extracted relational information. In this embodiment, the structural model generator 12 is an example of a generator. The structural model indicates a smallest unit of relational information (i.e., based on dependence relationships and accessibility relationships) between types of CI (CI types) managed by the CMDB 11. The CI type indicates a type of each of the CIs. That is, although each of the CIs has a specific entity, each of the CI types simply indicates corresponding classification (type). For example, when servers are subject to management, the "CI" indicates each of the servers, and the "CI type" to which the respective servers belong indicates "Server".

The smallest unit of the relationship between the CI types indicates a relationship between the two CI types. That is, relationships between CI types may form a hierarchical tree structure having a plurality of levels and branches; however, the smallest unit of the relationship extracted as a structural model is the relationship between the two CI types. Hence, each of the relationships, which is extracted as a structural model, may be a corresponding one of the branches of the tree structure representing the relationships between the CI types potentially held by the CMDB 11. That is, the tree structure representing the relationships between the CI types potentially held by the CMDB 11 may be divided per relationship between the two CI types. However, this does not indicate that a process of dividing the relationships is required. This is because the potential tree structure representing the relationships between the CI types in the CMDB 11 is formed by connecting between the smallest units of the corresponding relationship. That is, the smallest units of the relationship may be extracted prior to the formation of the tree structure representing the relationships between the CI types.

The structural model storage unit 13 is configured to store a collection of the structural models generated by the structural model generator 12 utilizing the auxiliary storage device of the configuration management server 10. Note that in this embodiment, the structural model may be an example of the relational information.

The reference model generator 14 is configured to generate a reference model based on the structural models stored in the structural model storage unit 13. In this embodiment, the reference model generator 14 is an example of a storage unit.

The reference model indicates data utilized as filter information for limiting the CIs subject to reference (reference range) and their relationships. The reference model itself includes data indicating routes of the relationships between the CIs. The reference model generator 14 generates various reference models having different reference ranges.

The reference model storage unit 15 is configured to store reference models generated by the reference model generator 14 utilizing the auxiliary storage device of the configuration management server 10. Note that in this embodiment, the reference model may be an example of the referential relational information.

The display controller 16 is configured to control the display of the management information of the CMDB 11. Specifically, the display controller 16 searches the CMDB 11 for information associated with a specific CI specified by a request from the client apparatus 20 and CIs sequentially relating to the specified CI in response to the request from the client apparatus 20. The display controller 16 sends a result of the search (search result) to the client apparatus 20 as a response. The search result itself or a range of the search result subject to display is limited (filtered) by the reference model(s). Note that the CIs sequentially relating to the specified CI indicates the CIs having direct or indirect relationships with the specified CI. The direct relationship indicates a relationship that is formed between the two CIs. The indirect relationship indicates a relationship that is formed via one CI or more.

Figure 2:
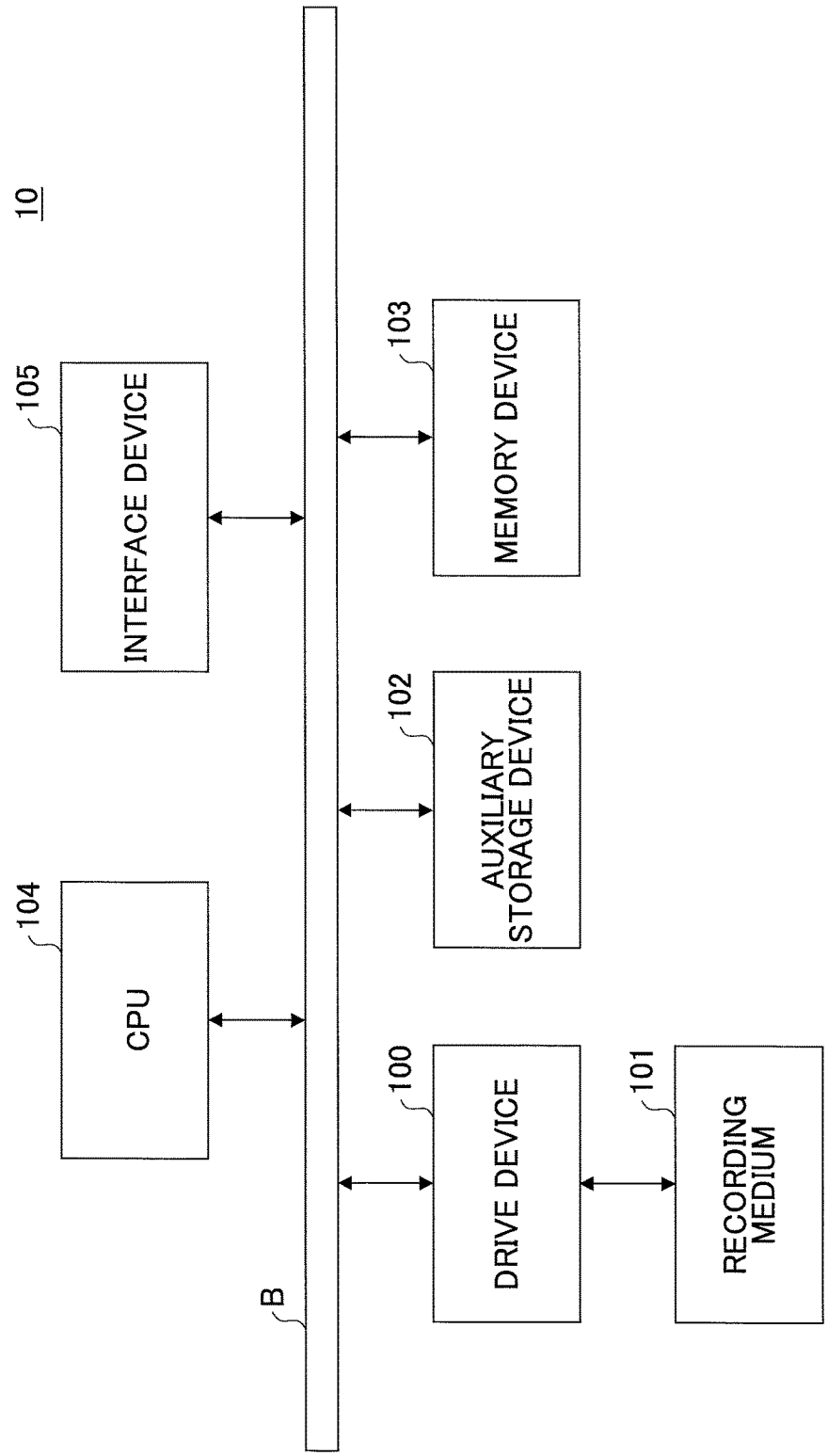
FIG. 2 is a diagram illustrating a hardware configuration example of a configuration management server in one embodiment.

FIG. 2 is a diagram illustrating a hardware configuration example of a configuration management server in an embodiment. As illustrated in FIG. 2, the configuration management server 10 includes a drive device 100, an auxiliary storage device 102, a memory device 103, a CPU 104, and an interface device 105, which are connected to one another via a bus B.

Programs implemented by the configuration management server 10 may be provided in a form of a recording medium 101 such as a CD-ROM. When the recording medium 101 storing the programs is set in the drive device 100, the programs are installed in the auxiliary storage device 102 via the drive device 100. Note that the programs are not necessarily installed via the recording medium 101. The programs may be downloaded from another computer via the network. The auxiliary storage device 102 is configured to store the installed programs, and necessary files or data.

The memory device 103 is configured to retrieve a certain program from the auxiliary storage device 102 and store the program when the configuration management server 10 receives an instruction to activate the program (i.e., a program activating instruction). The CPU 104 is configured to execute functions associated with the configuration management server 10 in compliance with the programs stored in the memory device 103. The interface device 105 is configured to serve as an interface for connecting the configuration management server 10 to the network.

Figure 3:
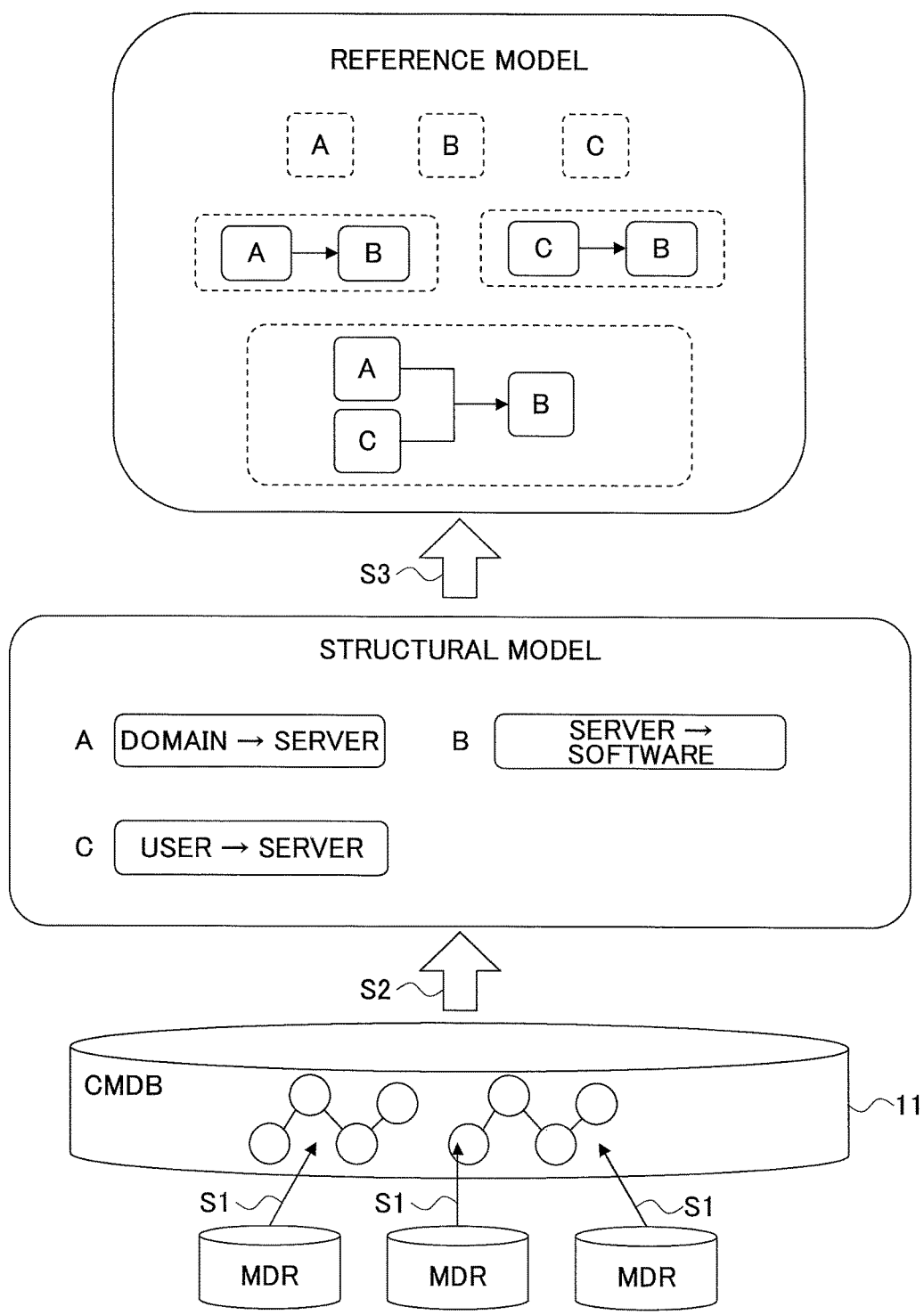
FIG. 3 is a diagram illustrating an outlined example of a process executed by the configuration management server.

In the following, a description will be given of a process executed by the configuration management server 10. FIG. 3 is a diagram illustrating an outline of an example of a process executed by the configuration management server 10.

Initially, data (CIs and relationships between CIs) are registered in the CMDB 11 from each of the MDRs 30 (step S1). The above data registration may be performed aperiodically. For example, when an MDR 30 is registered or deregistered into the CMDB 11 (the registration or deregistration of the MDR 30 into the CMDB 11), or when data are updated in the MDR 30, data are registered into the CMDB 11 from the MDR 30. The registration of the MDR 30 into the CMDB 11 indicates that the MDR 30 is subject to management in the CMDB 11. The MDR 30 subject to management in the CMDB 11 may be able to register its data into the CMDB 11.

Formats or schemas of the MDRs 30 are not necessarily unified. Further, the data corresponding to an identical entity (e.g., the data associated with an identical user) may be distributed in a plurality of the MDRs 30 such that the distributed data are managed by the respective MDRs 30. Hence, when data are registered into the CMDB 11 from the MDR 30, a data format of the MDR 30 is converted into a data format of the CMDB 11. Further, the CMDB 11 basically manages data having the identical entity as a single CI. Hence, the CMDB 11 integrates information corresponding to data having the identical entity that are distributed in the plurality of MDRs 30. For example, respective attribute items managed by the MDRs 30 are merged corresponding to a single CI and the merged attribute item is registered into the CMDB 11.

Subsequently, the structural model generator 12 generates a structural model based on the CMDB 11 (step S2). That is, a relationship between the CI types in the CMDB 11 is extracted as a structural model.

FIG. 3 illustrates examples of structural models A to C that have been extracted in the CMDB 11. The structural model A indicates a relationship between a domain and a server. The structural model B indicates a relationship between the server and software. The structural model C indicates a relationship between a user and the server. Note that in the structural models, the CI type at the head of an arrow indicates a "relational destination" whereas the CI type at the stem of the arrow indicates a "relational source". Note that in general, the "relational destination" may also be called a "reference destination". Likewise, the "relational source" may also be called a "reference source". As described above, the relationship between the CIs (i.e., the CI types) has a direction.

Subsequently, the reference model generator 14 generates a reference model based on the structural model (step S3). As illustrated in FIG. 3, a single structural model or a combination of two or more (connected) structural models may be generated as a reference model. The two or more structural models may be connected when the type of the relational destination matches the type of the relational source. A reference model is generated for each of the combinations of two or more structural models that may be connected based on the matched type of the relational destination and the relational source. In addition, a reference model may be generated by connecting between two or more reference models.

After the generation of the reference model, the CMDB 11 may be referred to utilizing the generated reference model. For example, when a reference model A→B is selected, a reference range is limited to CIs relating to a domain→a server→software. As described above, the reference model may be formed of a single structural model or all the combinations of connectable structural models, that is, all the combinations of the routes of the effective relationships between the CI types. Thus, there is a high possibility that the reference model that a user desires to select as a reference range may be included in the selection. Note that when the number of all the combinations is large, a range of the combinations serving as the reference model may be limited based on a predetermined rule.

In the following, a further detailed description is given of a structural model generating process, a reference model generating process, and a CMDB 11 display control process.

Figure 4:
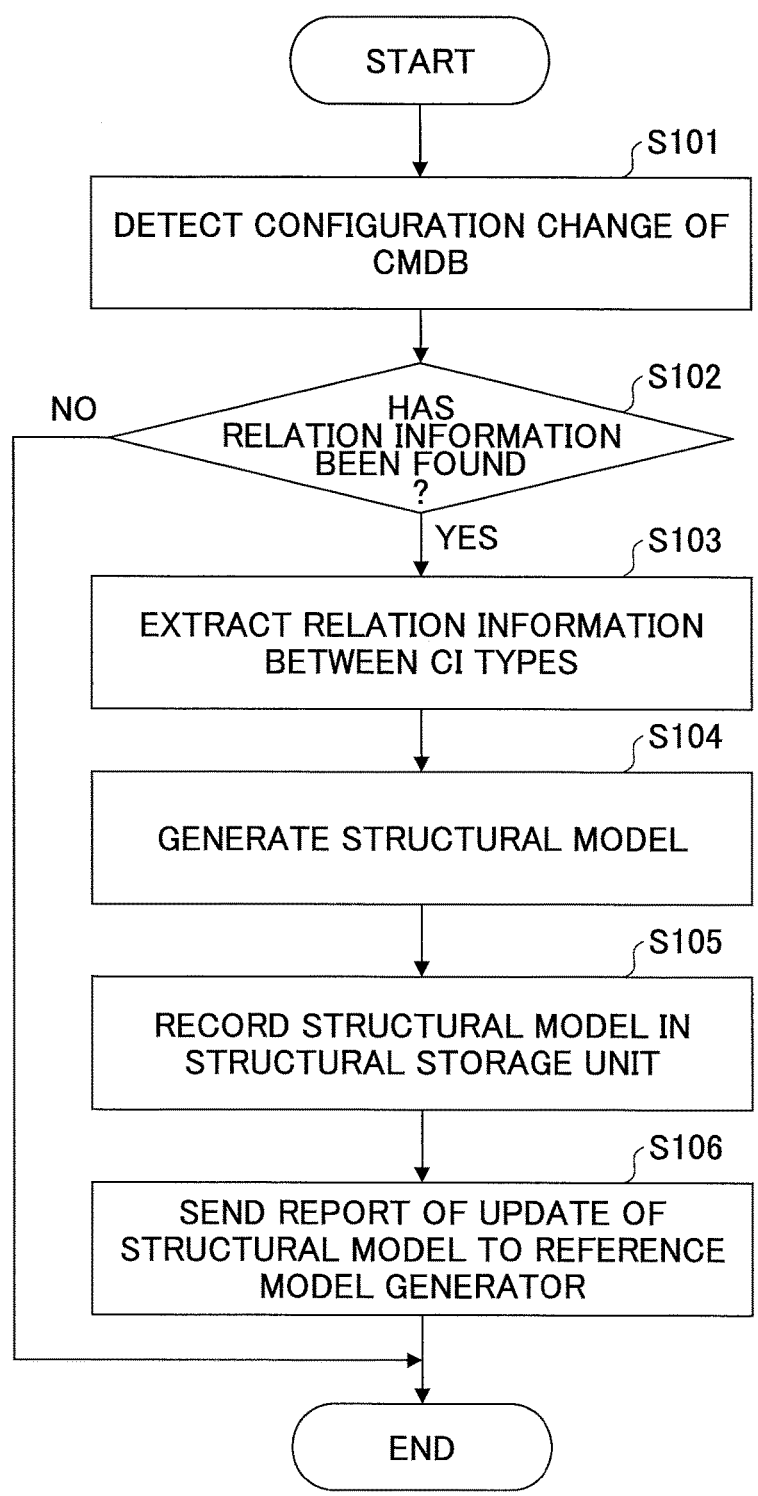
FIG. 4 is a flowchart illustrating an example of a structural model generating process.

FIG. 4 is a flowchart illustrating an example of a structural model generating process.

In step S101, the structural model generator 12 detects a change of a configuration of the CMDB 11. For example, when a new MDR 30 is registered into the CMDB 11, or the existing MDR 30 is deregistered in the CMDB 11, the configuration of the CMDB 11 is changed. That is, in a case of the former, data of the new MDR 30 are registered into the CMDB 11. In a case of the latter, data of the existing MDR 30 are deleted from the CMDB 11. Likewise, when the configuration of the existing MDR 30 is changed (e.g., data are updated), the change of the configuration of the existing MDR 30 is reflected in the CMDB 11.

The detection of the configuration change of the CMDB 11 by the structural model generator 12 may be performed based on a report from the CMDB 11 or the MDR 30 that serves as a source of the configuration change. Alternatively, the structural model generator 12 actively detects the configuration change of the CMDB 11 by monitoring the CMDB 11 with polling or the like.

In this case, it is assumed that the CMDB 11 registers a new MDR 30*a* that manages the data illustrated in FIG. 5. That is, it is assumed that the data illustrated in FIG. 5 are registered into the CMDB 11.

FIG. 5 is a diagram illustrating a configuration example of the MDR registered in the CMDB. In FIG. 5, the MDR 30*a* includes a domain table 41, a server table 42, a software table 43, and a user table 44. Note that FIG. 5 illustrates a format of the MDRs that have been registered in the CMDB 11. For example, the CI type of each of the tables in FIG. 5 is defined by the CMDB 11.

The domain table 41 manages configuration items (CIs) having a CI type "ServerDomain". Specifically, the domain table 41 stores a domain ID, a domain name, a network ID, and the like for each (entity) of the server domains. The domain ID is an identifier for uniquely identifying each of the server domains. The domain name is a name of the server domain. The network address is an IP address associated with the server domain.

The server table 42 manages configuration items (CIs) having a CI type "Server". The server table 42 stores a server ID, a host name, an IP address, an OS type, an attending domain ID, an administrator ID, and the like for each (entity) of the servers. The server ID is an identifier for uniquely identifying each of the servers. The host name is a name of the server. The IP address is an IP address of the server. The OS type is a name of the operating system (OS) installed in the server. The attending domain ID is a domain ID of the server domain to which the server belongs. That is, the attending domain ID corresponds to relationship information between a CI having the CI type "ServerDomain" and a CI having the CI type "Server". In the CMDB 11 in this embodiment, the CI of the relational destination has an ID of the CI of the relational source. Hence, the CI type "ServerDomain" is a relational source and the CI type "Server" is a relational destination. The administrator ID is a user ID of the server's administrator. That is, the administrator ID corresponds to relationship information between a CI having the CI type "User" and a CI having the CI type "Server". Hence, the CI type "User" is a relational source and the CI type "Server" is a relational destination.

The software table 43 manages configuration items (CIs) having a CI type "Software". The software table 43 stores a software ID, a product name, a version, an installation destination server ID, and the like for each (entity) of the software. The software ID is an identifier for uniquely identifying each of the software. The product name is a name of the software. The version is a version of the software. The installation destination server ID is a server ID of the server in which the software is installed. That is, the installation destination server ID corresponds to relationship information between a CI having the CI type "Server" and a CI having the CI type "Software". Hence, the CI type "Server" is a relational source and the CI type "Software" is a relational destination.

The user table 44 manages configuration items (CIs) having a CI type "User". The user table 44 stores a user ID, a user name, and the like for each (entity) of the users. The user ID is an identifier for uniquely identifying each of the users. The user name is a name of the user.

Note that the above relationships may be represented by data structures other than those illustrated in FIG. 5. For example, a table may be provided for each of the relationships between the CI types. For example, relational information between a CI having the CI type "ServerDomain" and a CI having the CI type "Server" may be recorded in a table managing the relationship between the CI type "ServerDomain" and the CI type "Server".

Further, the CMDB 11 may have a format other than the table format.

Subsequently, the structural model generator 12 determines whether the data newly registered in the CMDB 11 contain the relational information (step S102). When the newly registered data do not contain the relational information ("No" in step S102), the structural model generating process illustrated in FIG. 4 is terminated. When, on the other hand, the newly registered data contain the relational information ("Yes" in step S102), the structural model generator 12 extracts the relationship between the CI types from the data newly registered in the CMDB 11 (i.e., the data illustrated in FIG. 5) (step S103).

Subsequently, the structural model generator 12 generates a structural model based on the CMDB 11 (step S104).

Figure 6:
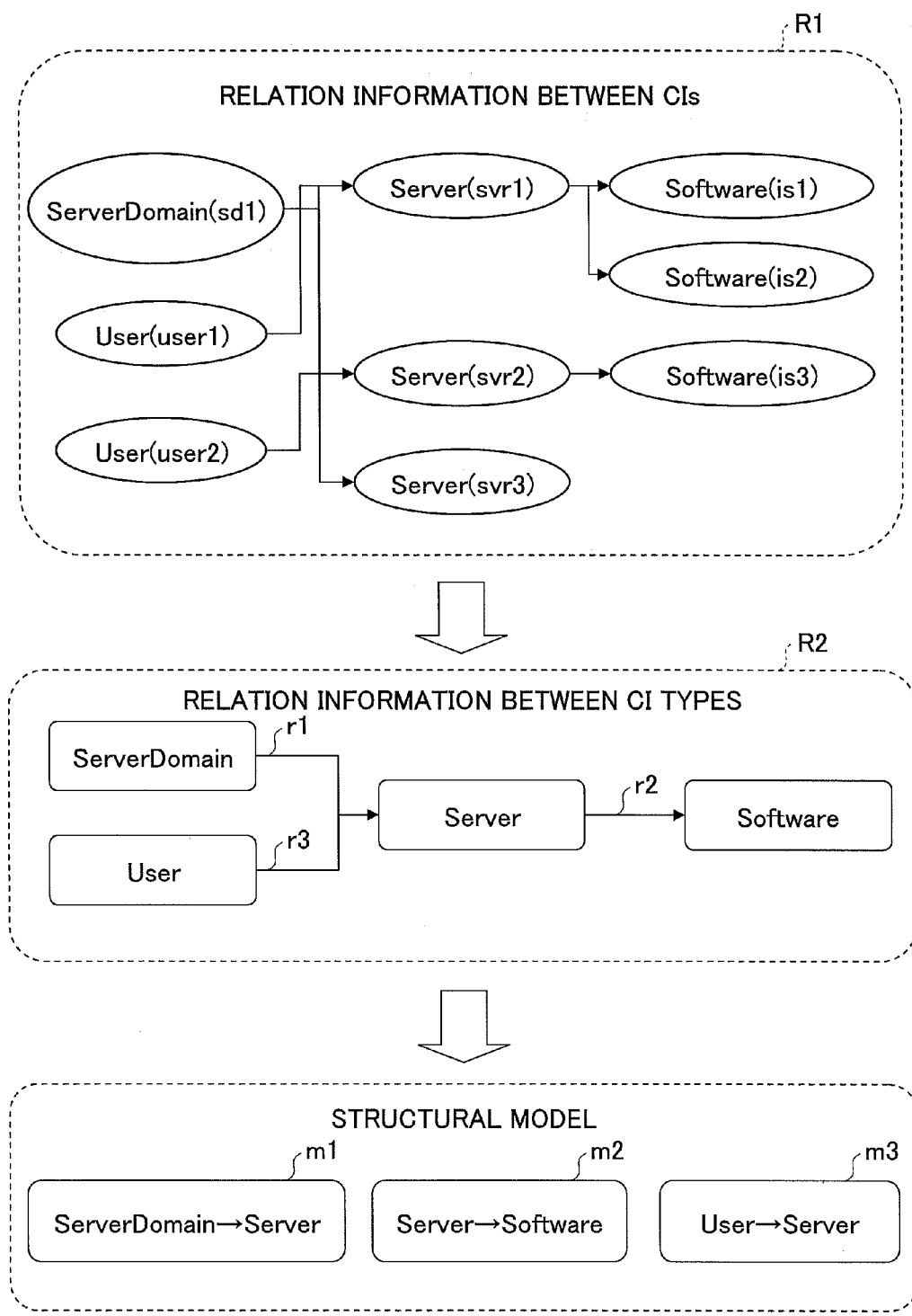
FIG. 6 is a diagram illustrating structural model generation.

FIG. 6 is a diagram illustrating structural model generation. The structural model generator 12 initially extracts relational information R1 between CIs. The relational information R1 in FIG. 6 illustrates merely a part of the relational information between the CIs extracted from the data illustrated in FIG. 5 for convenience of illustration.

Subsequently, the structural model generator 12 integrates the relationships contained in the relational information R1 for every CI type, and extracts (generates) relational information R2 between CI types. The relational information R2 includes three relationships r1 to r3. The direction of each relationship between the CI types follows the direction of each relationship between CIs. Note that in this embodiment, the respective relationships between the tables illustrated in FIG. 5 correspond to the relationships between the CI types. Accordingly, it may be possible to extract the relational information R2 without having the extracting process of the relational information R1 that is performed prior to the extracting process of the relational information R2.

Subsequently, the structural model generator 12 generates a structural model based on the relational information R2. That is, the structural model generator 12 generates information containing a relationship between two CI types and such a relationship as a structural model for every one of the relationships r1 to r3 between the CI types (the smallest unit of the relationship). The direction of the relationship in each structural model follows the direction of a corresponding one of relationships in the relational information R2. FIG. 6 illustrate three examples of generated structural models, namely, a structural model m1 based on the relationship r1, a structural model m2 based on the relationship r2, and a structural model m3 based on the relationship r3.

Subsequently, the structural model generator 12 assigns an identifier name (i.e., a structural model name) to each of the generated structural models, and stores each of the structural models with the assigned identifier name in the structural model storage unit 13 (step S105).

FIG. 7 is a diagram illustrating a configuration example of the structural model storage unit 15. As illustrated in FIG. 7, the structural model storage unit 13 is configured to store a structural model name and an associated route for every generated structural model. The structural model name is an identifier for uniquely identifying each of the structural models. The associated route includes information indicating a route of each of the relationships between the CI types in the generated structural model. The associated route may be information in any format insofar as the information may distinguish the CI type of the relational source from the CI type of the relational destination. Note that FIG. 7 only illustrates a newly added structural model in this embodiment; however, the structural model storage unit 13 accumulates all the structural models extracted from the CMDB 11.

Subsequently, the structural model generator 12 sends a report of an update of the structural model (the structural model storage unit 13) to the reference model generator 14 (step S106).

Note that when a part of the MDRs 30 is deregistered from the CMDB 11, or when a configuration of a part of the MDRs 30 is changed, the structural model generating process illustrated in FIG. 4 is, after the structural model storage unit 13 is cleared, executed based on the CMDB 11 in which the deregistration of the part of the MDRs 30 or the configuration change of the part of the MDRs 30 is reflected. When the part of the MDRs 30 is deregistered, it may be considered to delete the structural model associated with the relationship of such a MDR 30 alone, which may, however, be disadvantageous. This is because there may be other MDRs 30 that share the relationship of the aforementioned MDR 30. Hence, when the configuration of the part of the MDR 30 is changed, it may be advantageous to regenerate the structural model based on the CMDB 11 such that the contents of the CMDB 11 are correctly represented.

Figure 8:
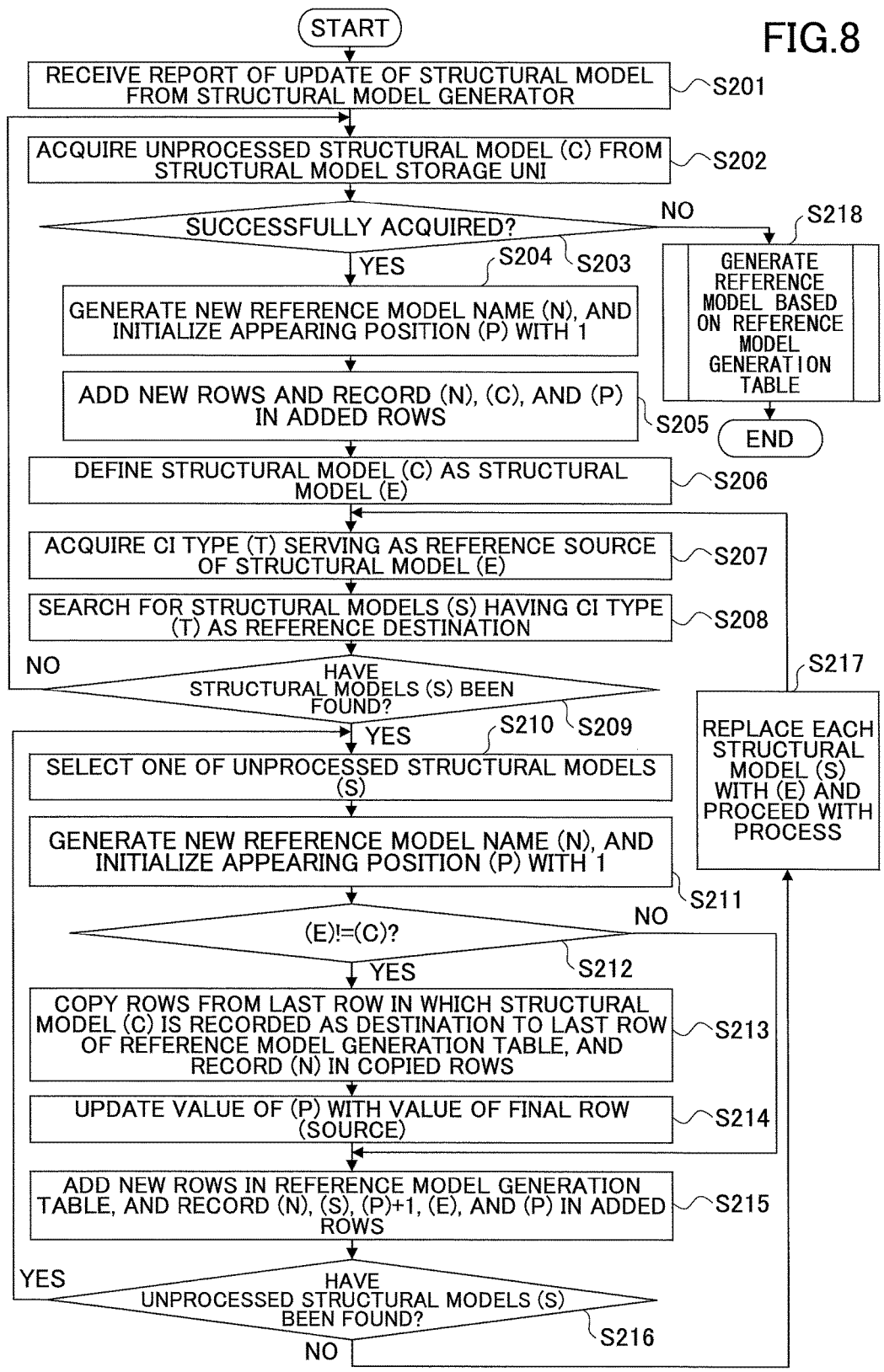
FIG. 8 is a flowchart illustrating an example of a reference model generating process.

Subsequently, a description will be given of a reference model generating process. FIG. 8 is a flowchart illustrating an example of a reference model generating process.

The reference model generator 14 acquires, on receiving the report of the update of the structural model from the structural model generator 12 (step S201), one of the unprocessed structural models from the structural model storage unit 13 (see FIG. 7) (step S202). Note that the acquired structural model is hereinafter called a "structural model (C)". The unprocessed structural models indicate those that are not subject to processing with respect to the reference model generating process illustrated in FIG. 8. Hence, all the structural models initially stored in the structural model storage unit 13 are unprocessed structural models. In the example of the structural model storage unit 13 illustrated in FIG. 7, the structural model (model-1) is acquired as the structural model (C).

When the structural model (C) is successfully acquired; that is, when an unprocessed structural model is present (found) in the structural model storage unit 13 ("Yes" in step S203), the reference model generator 14 generates one reference model name (N), and initializes an appearing position (P) with 1 (step S204). The reference model name is an identifier for uniquely identifying each of the reference models to be generated. The appearing position (P) is a value indicating a position of each of the structural models in the route associated with the structural model in the reference model to be generated. The value of the appearing position (P) corresponding to an end (tail) of the route associated with the reference model is set to 1. The value of the appearing position (P) in the reference model is incremented by 1 every time one relationship between the structural models is traced back in the reference model. Tracing back the relationship indicates tracing each of the relationships back from the relational destination to the relational source.

Subsequently, the reference model generator 14 adds one new row into a reference model generating table 17, and records a reference model name (N), a structural model name of a structural model (C), and an appearing position (P) in the added row of the reference model generating table 17 (step S205). The reference model generating table 17 is utilized as a temporary working area for generating a reference model. The reference model generating table 17 may, for example, be generated in the memory device 103.

FIG. 9 is a diagram illustrating a configuration example of a reference model generation table 17. As illustrated in FIG. 9, the reference model generating table 17 includes respective items of a reference model name, a structural model name (source), an appearing position (source), a structural model name (destination), an appearing position (destination), and the like. A row of the reference model generating table 17 basically includes two structural model names (corresponding to source and destination) and two appearing positions (corresponding to source and destination) that are connected in the reference model.

The reference model name is an identifier for uniquely identifying each of the reference models. The structural model name (source) and the appearing position (source) respectively serve as the structural model name and the appearing position of the relational source in the reference model. The structural model name (destination) and the appearing position (destination) respectively serve as the structural model name and the appearing position of the relational destination in the reference model.

Note that one structural model may form one reference model alone. Hence, there is no need to record the structural model name (source) and the appearing position (source) for the reference model formed of one structural model alone.

The reference model generating table 17 in FIG. 9 illustrates a state after the reference model generating process illustrated in FIG. 8 is applied to all the structural models illustrated in FIG. 7. The first row (i.e., the row of the reference model name "view-1") in FIG. 9 is recorded after step S205 in FIG. 8 is executed for the first structural model (model-1) in FIG. 7.

Subsequently, the reference model generator 14 defines the structural model (C) as a structural model (E) (step S206). The structural model (E) is the structural model at the front (hereinafter called the "forefront structural model") when the relationships between the structural models are traced back from the relational destination to the relational source in steps subsequent to step S207. Hence, the value of the structural model (E) may vary with the movement of the forefront structural model. On the other hand, the structural model (C) is a structural model that is stored as a starting point of the trace-back. Hence, in order to prevent the value of the structural model (C) from being updated due to the trace-back of the relationships, a value of the structural model (C) is assigned to a value of the structural model (E).

Subsequently, the reference model generator 14 acquires a CI type of the relational source in the structural model (E) (step S207). Note that the acquired CI type is hereinafter called a "CI type (T)". The CI type of the relational source of the structural model (model-1) in FIG. 7 is "ServerDomain". Hence, the "ServerDomain" is acquired as the CI type (T).

Subsequently, the reference model generator 14 searches the structural model storage unit 13 for the structural model having the CI type (T) ("ServerDomain" in this case) as the relational destination (step S208). The structural model storage unit 13 in FIG. 7 does not include the structural model having the CI type (T). In this case ("No" in step S209), the reference model generator 14 repeatedly executes steps subsequent to step S202. That is, unprocessed structural model (model-2) is defined as the structural model (C) and the structural model (E), and steps S204 to S208 are executed. As a result, the second row is added to the reference model generation table in FIG. 7.

The structural models that have the CI type (Server) of the relational source of the structural model (model-2) as a relational destination are the structural model (model-1) and the structural model (model-3). Hence, in step S208 where the structural model (model-2) is defined as the structural model (E), the two structural models are detected as a structural model (S) ("Yes" in step S209).

In step S210, the reference model generator 14 selects one of the unprocessed structural models (S) as a structural model subject to processing. The unprocessed structural models (S) indicate those that are not subject to processing with respect to steps subsequent to step S211. In this case, the structural model (model-1) is subject to processing.

Subsequently, the reference model generator 14 generates a new reference model name (N), and initializes an appearing position (P) with 1 (step S211). Subsequently, the reference model generator 14 determines whether the structural model (E) is the structural model (C); that is, whether the forefront structural model in the trace-back of the relationships is moved from the structural model (C) (step S212). In this case, the structural model (E) and the structural model (C) are both the structural model (model-2) ("No" in step S212). Thus, step S215 is subsequently processed in this case.

In step S215, the reference model generator 14 adds one new row into the reference model generating table 17, and records a reference model name (N), a structural model name of the structural model (S) subject to processing, an appearing position (P)+1, a structural model name of the structural model (E), and an appearing position (P) in the added row of the reference model generating table 17 (step S215). In this state, the third row in FIG. 9 is recorded. That is, the structural model name of the structural model (S) is recorded in a column of the structural model name (source). The appearing position (P)+1 is recorded in a column of the appearing position (source). That is, the structural model name of the structural model (E) is recorded in a column of the structural model name (destination). The appearing position (P)+1 is recorded in a column of the appearing position (destination).

Subsequently, the reference model generator 14 determines the presence or absence of the unprocessed structural model (S) (step S216). In this case, a structural model (model-3) remains as the unprocessed structural model (S) ("Yes" in step S216). Hence, the structural model (model-3) is selected as being subject to processing (step S210), and steps subsequent to step S211 are executed. As a result, the fourth row is added to the reference model generation table in FIG. 9.

When processing on all the (unprocessed) structural models (S) is completed ("No" in step S216), the reference model generator 14 executes steps subsequent to step S207 on each of the structural models (S) as a corresponding one of the structural models (E) (step S217). That is, each of the structural models (S) is defined as the forefront structural model in the trace-back of the relationships, and steps subsequent to step S207 are executed. In this case, the structural model that has the CI type of the relational source of the structural model (model-1) or the structural model (model-3) contained in the structural models (S) is not present in the structural model storage unit 13 ("No" in step S209). Hence, the reference model generating table 17 is not updated.

Subsequently, in step S202, the structural model (model-3) is defined as the structural model (C), and steps subsequent to step S203 are executed. As a result, the fifth row is added to the reference model generating table 17 (step S205). The structural model that has the CI type of the relational source of the structural model (model-3) as a relational destination is not present in the structural model storage unit 13 ("No" in step S209). Further, there is no structural model subsequent to the structural model (model-3) in the structural model storage unit 13 illustrated in FIG. 7 ("No" in step S203). Hence, the reference model generator 14 executes a reference model generating process based on the reference model generating table 17 (step S218).

The above description includes no illustration of steps S213 and S214. The steps S213 and S214 are not illustrated in the above case because the steps S213 and S214 are to be executed when the three structural models are connected across three or more hierarchical levels but the structural models illustrated in FIG. 7 are connected only across two hierarchical levels. Hence, in the following, steps S213 and S214 are illustrated with reference to an example where the three structural models are connected across three or more hierarchical levels.

Figures 10A, 10B:
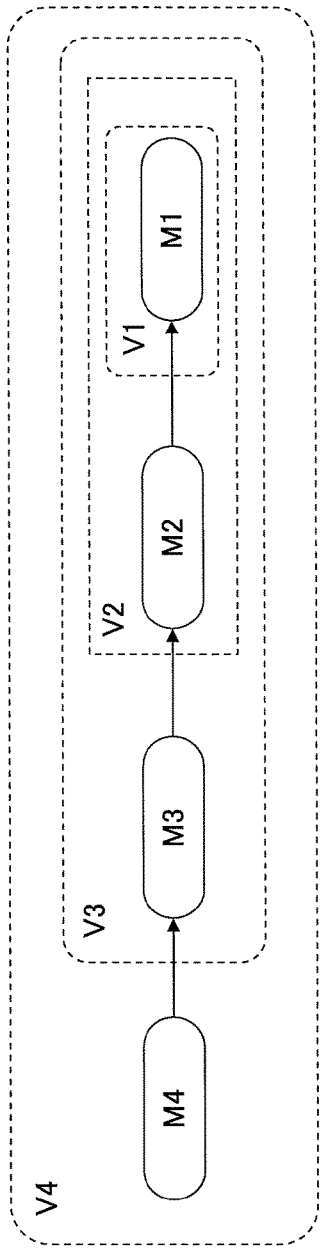
FIGS. 10A and 10B are diagrams respectively illustrating an example of structural models connecting three or more in hierarchical levels, and an example of a reference model generation table based on the structural models.

FIGS. 10A and 10B are diagrams respectively illustrating an example of structural models connecting three or more in hierarchical levels, and an example of reference model generation table based on such structural models.

M1 to M4 in FIG. 10A illustrate respective structural models. Arrows between the adjacent structural models each represent relationships between the adjacent structural models. The direction of the arrow indicates the direction of the corresponding relationship. In FIG. 10A, each of the ranges enclosed by a broken line indicates a range of the reference model generated in the reference model generating process illustrated in FIG. 8. For example, a range of a reference model V1 includes a structural model M1. Similarly, a range of a reference model V3 includes structural models M1, M2, and M3. Note that in the following description, M1 to M4 represent structural models, or structural model names of reference models, and V1 to V4 represent reference model names.

With respect to the structural models in FIG. 10A, a case where the structural model M1 is selected as being subject to processing (i.e., the structural model (C)) in step S202 in FIG. 8 is illustrated.

In this case, since processes of recording the first and the second rows in the reference model generating table 17a in FIG. 10B are obvious from the aforementioned description of the application of the reference model generating processing illustrated in FIG. 8 to the structural models in the structural model storage unit 13 illustrated in FIG. 7, the illustration of the processes of recording the first and the second rows in the reference model generating table 17a are omitted. Note that in step S215 immediately after the process of recording the second row in the reference model generating table 17a, the structural model (C) and the structural model (E) are both the structural model M1. Further, the (unprocessed) structural model (S) is the structural model M2.

The structural model that is detected as the structural model (S) with respect to the structural model M1 is the structural model M2 alone ("No" in step S216). Hence, the reference model generator 14 defines the structural model M2 as the structural model (E), and proceeds with step S207 (step S217).

Subsequently, the structural model M3 is detected as the structural model (S) with respect to the structural model M2 ("Yes" in steps S207, S208, and S209). Hence, the structural model M3 is selected as being subject to processing, and steps subsequent to step S210 are executed.

At this point, the structured model (E) is the structured model M2. Likewise, the structural model (C) is the structural model M1 ("Yes" in step S212). Hence, the reference model generator 14 proceeds with step S213. In step S213, the reference model generator 14 copies the rows from the last row in which the structural model name of the structural model (C) (i.e., the structural model M1) is recorded as the structural model name (destination) to the last row of the reference model generating table 17a, and newly adds the copied rows to the reference model generating table 17a. The reference model generator 14 records the reference model name generated in step S211 in each of the added copied rows (step S213).

Referring to FIG. 10B, in a state where the second row has been recorded in the reference model generating table 17a, the last one of the rows having (recording) the structured model name of the structural model M1 as the structured model name (destination) is the second row. The last row of the reference model generating table 17a in the same state is also the second row. Hence, a copy of the second row is added as the third row of the reference model generating table 17a. Note that a newly generated "V3" is recorded as the reference model name of the second row.

Subsequently, the reference model generator 14 updates the value of the appearing position (P) with the appearing position (source) of the last row that is newly added in step S213. Hence, value of the appearing position (P) is 2 in this state.

Subsequently, the reference model generator 14 adds one new row into the reference model generating table 17a, and records a reference model name, a structural model name of the structural model M3, an appearing position (P)+1, a structural model name of the structural model M2, and an appearing position M2 that are identical to those in step S213 in the added row of the reference model generating table 17a (step S215).

In this state, the fourth row in FIG. 10B is recorded. Note that the reference model name in the fourth row is the same as that of the third row. That is, the third row and the fourth row have information associated with the identical reference model.

That is, steps S213 and S214 are processes for generating the reference model containing the structural models across three or more hierarchical levels. Specifically, step S213 is a process for recording a route from the structural model (C) to the current forefront structural model (E) in the reference model generating table 17a. In order to simplify this process, the existing record indicating the above route is copied.

Subsequently, the structural model (C) remains as the structural model M1, whereas the forefront structural model (E) sequentially moves to the structural model M3, and then to the structural model M4 in a manner similar to the above. The reference model generating table 17a in FIG. 10B illustrates a state at which the search associated with the structural model M1 upto an end (head) of the route (the structural model M4) is completed.

In this state, three rows associated with the reference model V4 are added into the reference model generating table 17a.

Figure 11:
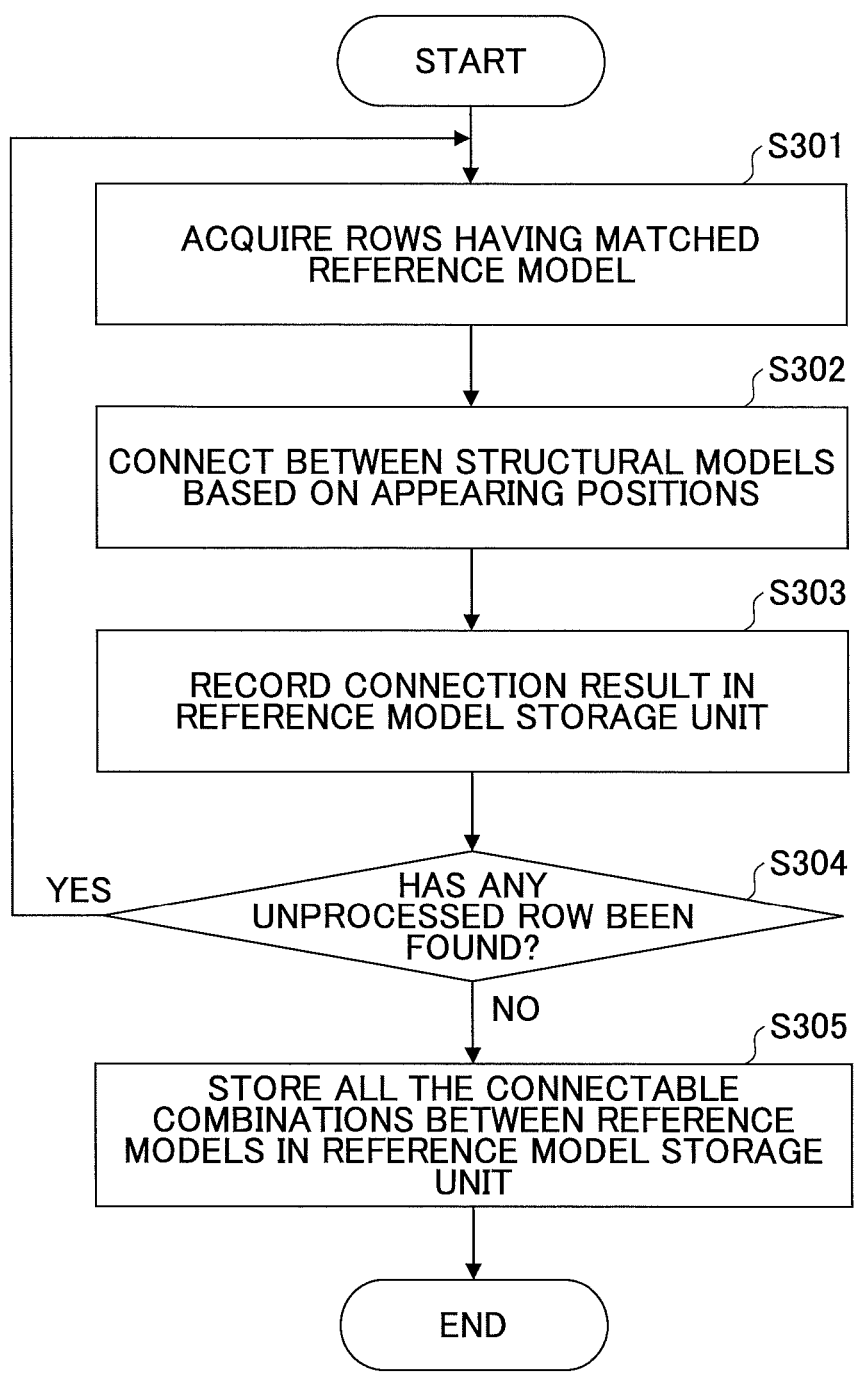
FIG. 11 is a flowchart illustrating an example of a reference model generating process based on the reference model generation table.

Subsequently, a detailed description will be given of step S218 illustrated in FIG. 8. FIG. 11 is a flowchart illustrating an example of a reference model generating procedure based on the reference model generation table 17a.

In step S301, the reference model generator 14 sequentially acquires from the top of the rows all the rows that have the matched reference model name. In the example of the reference model generation table 17 in FIG. 9, the respective rows include different reference model names. Hence, the reference model generator 14 sequentially acquires each of the rows in this example.

Subsequently, the reference model generator 14 connects between the structural models contained in the acquired rows based on the appearing positions of the acquired rows (step S301). That is, relationships are generated (established) between the structural models. The sources (the relational sources) and destinations (the relational destinations) of the relationships are determined based on the appearing positions, respectively. That is, the relational destination is defined by the appearing position having a smaller value whereas the relational source is defined by the appearing position having a lager value. Note that a plurality of the rows are acquired for each of V3 and V4 of the reference model generating table 17a in FIG. 10B. In this case, connected results of the structural models having the same appearing positions in each of the rows are connected. As a result, a connected result of the structural models that connected across the three or more in hierarchical levels are generated.

Subsequently, the reference model generator 14 records the connected result of the structural models in the structural model storage unit 15 as a reference model (step S303).

FIG. 12 is a diagram illustrating a configuration example of a reference model storage unit. As illustrated in FIG. 12, a reference model storage unit 15 is configured to store a reference model name and an associated route for every generated reference model. The reference model name is an identifier for uniquely identifying each of the reference models. The associated route includes information indicating a route of each of the relationships between the CI types in the generated reference model.

Subsequently, the reference model generator 14 records a result obtained by replacing the structural models of the connected result with the associated route of the CI types as the associated route of the reference model storage unit 15 by referring to the structural model storage unit 13. The reference model name of the reference model storage unit 15 receives the values of the reference model names of the reference model generating table 17 (FIG. 9).

When the reference model generator 14 has executed steps S301 to S303 on all the rows of the reference model generating table 17 ("No" in step S304), the reference model generator 14 proceeds with step S305. Note that at this point, the reference model storage unit 15 has records of view-1 to view-5.

Subsequently, the reference model generator 14 extracts all the connectable combinations of the reference models recorded in the reference model storage unit 15, and stores each of the connected results of the combinations as a reference model in the reference model storage unit 15 (step S305). Note that the connectable combination indicates a combination of two or more reference models that are connectable based on a matched result between the CI types, that is, the CI type of one of the reference models located at the end (tail) and the CI type of another reference model. The combination includes a case where CI types of the respective ends (tails) of the two reference models (i.e., a CI type having no relational destination are matched. However, the number of combined reference models is not limited to two. Further, the combination of the reference models having an inclusion relation is excluded. That is, the combination of the reference models having an inclusion relation is the same as one reference model that includes the other one. Further, when the combined result includes identical associated routes, such duplication is eliminated.

That is, step S305 is a process for generating all the reference models mutually connected to one another in a branched manner (branched relationship). As a result, the reference models "view-6" and "view-7", as illustrated in FIG. 12, are generated. The reference model "view-6" is generated as a result of connecting the reference model "view-1" and the reference model "view-5" by the CI type "Server". The reference model "view-7" is generated as a result of connecting the reference model "view-1" and the reference model "view-4" by the CI type "Server". Note that the reference model "view-7" may alternatively be generated as a result of connecting the reference model "view-3" and the reference model "view-5" by the CI type "Server". Note also that in the respective associated routes of the reference model "view-6" and the reference model "view-7", a symbol "||" indicates a branch.

Figure 13:
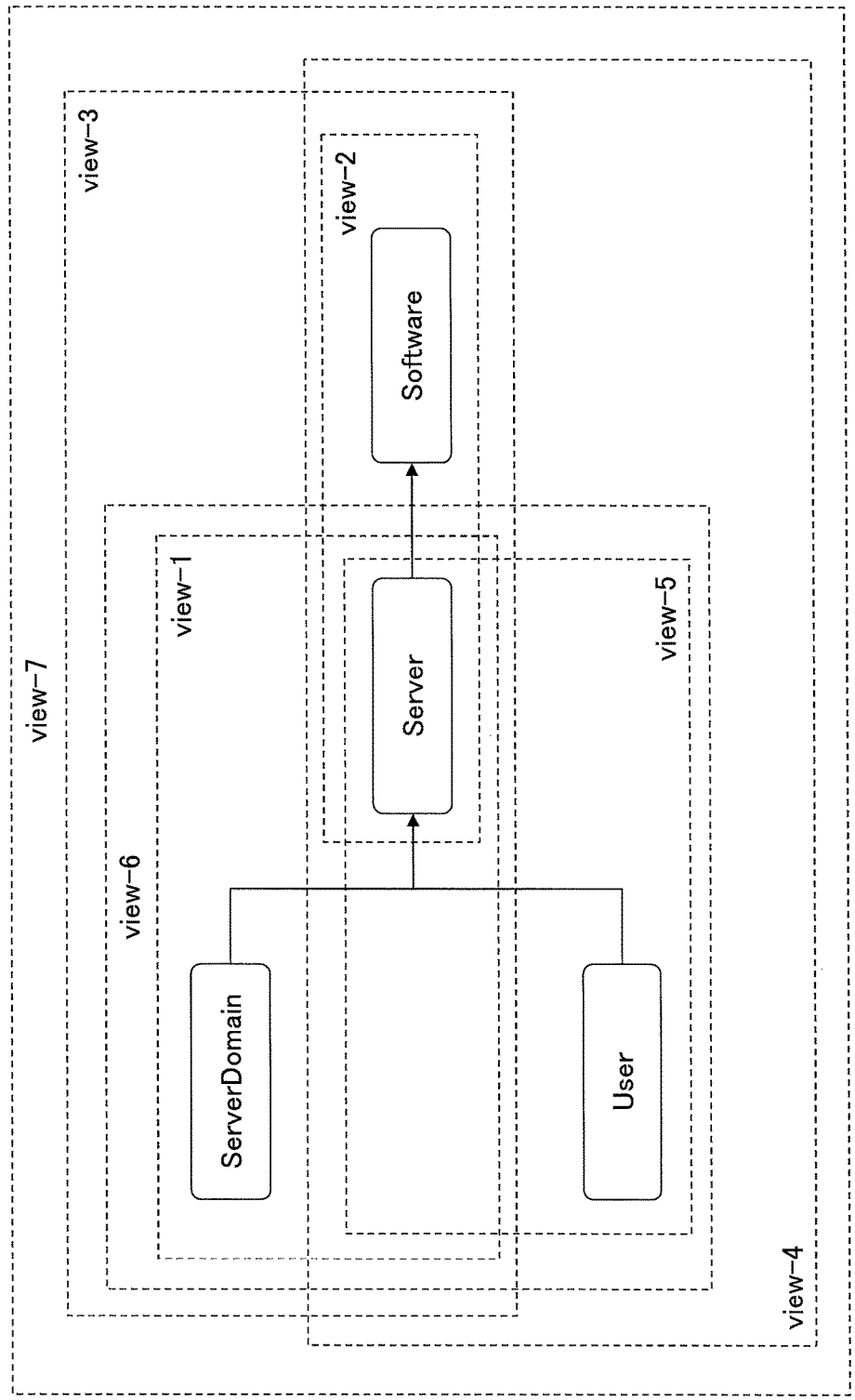
FIG. 13 is a schematic diagram illustrating ranges of the reference models.

The ranges (routes) of the reference models may schematically be illustrated as in FIG. 13. FIG. 13 is a schematic diagram illustrating the respective ranges of the reference models. In FIG. 13, each of the ranges indicated by a broken line rectangle illustrates a range of a reference model or a route of the CI types belonging to a reference model. The reference numerals provided with the broken line rectangles correspond to the reference model names of the reference model storage unit 15 in FIG. 12.

Figure 14:
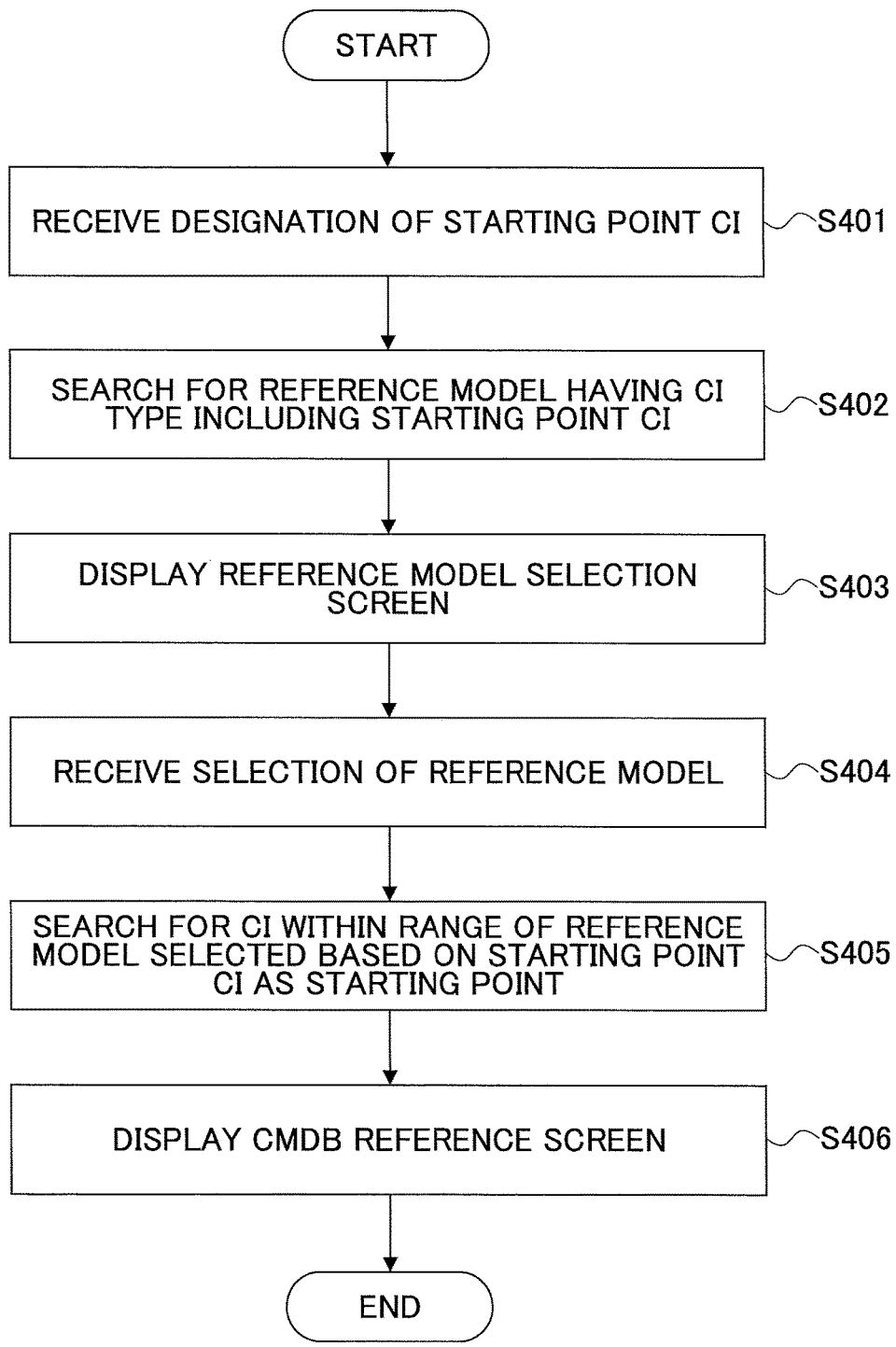
FIG. 14 is a flowchart illustrating an example of a CMDB display control process.

The generation of the reference models (the reference model generating process) is thus terminated. Subsequently, a description will be given of a CMDB 11 display control process utilizing the reference models. FIG. 14 is a flowchart illustrating an example of a CMDB display control process. Note that the CMDB display control process illustrated in FIG. 14 is executed asynchronously with the processes illustrated in FIGS. 4 to 11. For example, the CMDB display control process illustrated in FIG. 14 are executed when a user inputs an instruction to refer to a CMDB 11 (hereinafter called a "CMDB reference instruction").

In step S401, the display controller 16 receives a designation of a CI serving as a reference starting point (hereinafter referred to as a "starting point CI") from a user. For example, the display controller 16 causes a client apparatus 20 to display a search screen of CIs, and searches the CMDB11 for the CIs that match a condition designated by the user via the search screen. The display controller 16 causes the client apparatus 20 to display a list of the CIs as a search result, prompts the user to select the starting point CI from the list of CIs, and then receives the designation of the starting point CI from the user. Note that there may be two or more starting point CIs.

The display controller 16 also receives designation of an expansion direction along with the designation of the starting point CI. The expansion direction indicates a parameter specifying one of the directions of the starting point CI for expansion (i.e., subject to search (search expansion)). The expansion direction may have respective values of a forward direction, a backward direction, a two-way direction, and the like. The forward direction indicates a direction of a relational destination of the starting point CI. The backward direction indicates a direction of a relational source of the starting point CI. The two-way direction indicates the forward and backward directions.

Subsequently, the display controller 16 searches the reference model storage 15 for all the reference models having the CI type of the starting point CI (step S402). The CI type of the starting point CI may be identified by searching the CMDB 11 for information of the starting point CI.

Subsequently, the display controller 16 causes the client apparatus 20 to display a reference model selection screen (step S403).

Figures 15, 16:
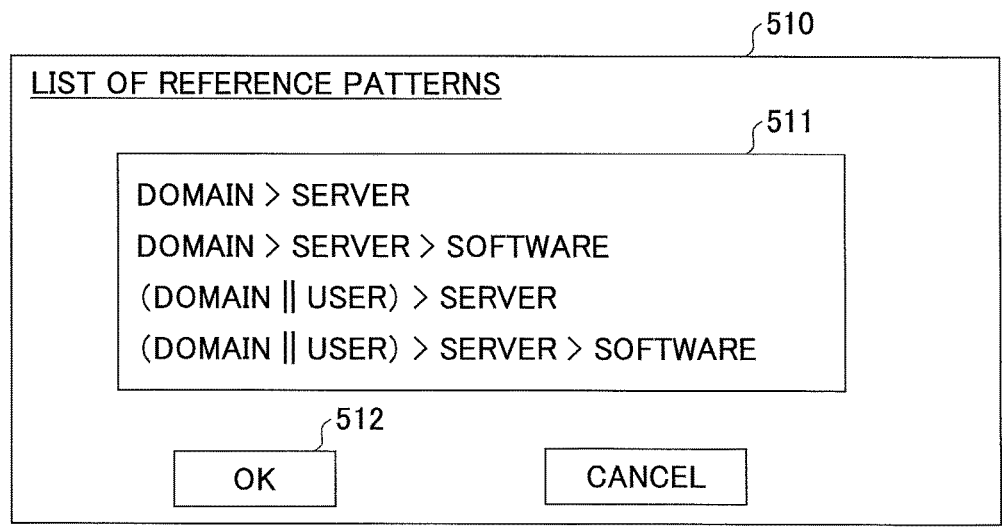
FIG. 15 is a diagram illustrating a display example of a reference model selection screen.
FIG. 16 is a diagram illustrating a configuration example of a CI type display name list table.

FIG. 15 is a diagram illustrating a display example of the reference model selection screen. As illustrated in FIG. 15, a reference model selection screen 510 includes a reference model selection region 511, and the like.

The reference model selection region 511 displays a list of the reference models that have been searched for in step S402 in a selectable manner. FIG. 15 illustrates an example of the CI belonging to "ServerDomain" being designated as the starting point CI. Hence, all the reference models containing "ServerDomain" are displayed.

Note that in FIG. 15, each of the CI types is displayed by a character string (display name). This is because the display controller 16 converts the CI types into respective display names for displaying the reference model selection screen by referring a display name list table.

FIG. 16 is a diagram illustrating a configuration example of a CI type display name list table. As illustrated in FIG. 16, the CI type display name list table 18 includes respective display names for the CI types. Note that the CI type display name list table 18 may, for example, be stored in advance in the auxiliary storage device 102.

Subsequently, the display controller 16 receives selection of the reference models via the reference model selection screen 510 (step S404). That is, when the user selects any one of the reference models displayed in the reference model selection region 511, and clicks an OK button, the display controller 16 stores the reference model name of the selected reference model utilizing the memory device 103.

Subsequently, the display controller 16 searches the CMDB 11 for CIs sequentially relating to the starting point CI by tracing back the relationships between the CIs (step S205). In this case, a direction for tracing back the relationships is a direction designated as the expansion direction. Further, the search range is a range indicated by the selected reference model(s). Specifically, the reference models having the CI "ServerDomain" as a starting point CI and associated with "DOMAIN>SERVER>SOFTWARE" when the expansion direction is the forward direction or the backward direction. In this case, the CI having the starting point CI as the relational source (server CI) is searched for the reference models having the CI type "Server". Subsequently, the CI having the detected (found) server CI as the relational source is searched for among the reference models having the CI type "Software". Note that the obtained result (search result) may, after the execution of the search, be limited by the reference models without limiting the search range.

Subsequently, the display controller 16 causes the client apparatus 20 to display a CMDB reference screen (step S406).

Figure 17:
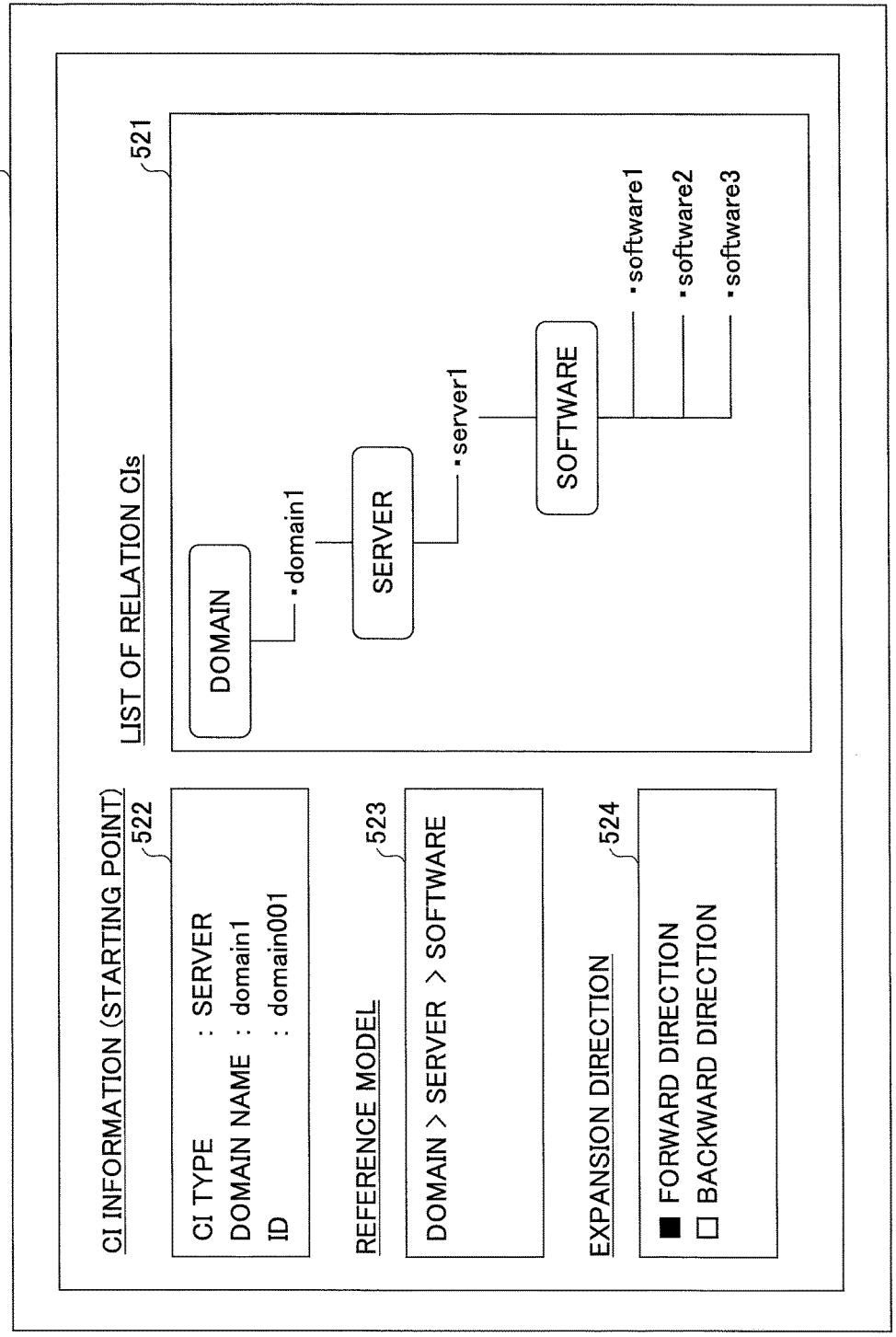
FIG. 17 is a diagram illustrating a display example of a CMDB reference screen.

FIG. 17 is a diagram illustrating a display example of the CMDB reference screen. In FIG. 17, the CMDB reference screen 520 includes a relation CI list display region 521, a starting point CI information display region 522, a reference model display region 523, an expansion direction display region 524, and the like.

The relation CI list display region 521 displays the search result obtained in step S405 in a tree structure. That is, the relation CI list display region 521 displays tree components having the found CIs (search result) as nodes.

The starting point CI information display region 522 displays information associated with the starting point CI. In FIG. 17, the starting point CI information display region 522 includes a CI type, a domain name, and an ID (i.e., a domain ID).

The reference model display region 523 displays the reference model selected in the reference model selection screen 510. The user may be able to check what types of reference models are currently based on to display the reference models in the reference model display region 523 by checking a display content of the reference model display region 523.

The expansion direction display region 524 displays a designated expansion direction.

Hence, the CIs subject to display in the CMDB reference screen 520 are limited within a range of the CIs desired by the user. Accordingly, the complication due to the display of unnecessary CIs or defects due to failure to display necessary CIs may be eliminated.

Note that the above-described example illustrates a case where the search results are expanded simultaneously. However, the search may be conducted for each level of the relationships by maneuvering the nodes of the reference model display region 523. In this case, the referable range (search range) may also be limited by the selected reference model(s).

As described above, the above embodiment may be able to facilitate the task for limiting the reference range of the database. That is, the configuration management server 10 extracts the relationships between the CIs from the CMDB 11 (MDRs 30), and connects between the extracted relationships so as to automatically generate the reference models for limiting the reference range (i.e., the reference route) of the CNDB 11. When the CMDB 11 is referred to, the configuration management server 10 prompts the user to select one of the reference models corresponding to a desired reference range, and limits a reference range of the CMDB 11. That is, the reference range (i.e., the search range) is limited within a range of the CI types contained in the selected reference model.

Hence, it may be possible to eliminate the user's complicated task to select the CIs and their relationships that belong to the user's desired reference range.

Note that in the above embodiment, the CMDB 11 or MDRs 30 are employed as an example of the database. However, this does not imply an applicable range to which contents subject to information processing described in the above embodiments is limited to the CMDB or the like. That is, the contents subject to information processing may be effectively applied to various types of databases that manage data and the relationships between the data.

As described above, the above embodiment may be able to facilitate the task for limiting the reference range of the database.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A data reference assistant apparatus, comprising:
a processor; and
a storage unit storing a database which manages component information and location relation information, and storing a program which when executed causes the processor to perform a process including:
generating data-type relation information between combinations of two data types from the component information and the location relation information which are managed in the database stored in the storage unit, the component information indicating components of data that include a data type of data, and the location relation information indicating a relational destination or a relational source between two or more of the data, for each of the data;
connecting two or more connectable combinations of the data-type relation information based on a matching result between a data type of the relational destination and a data type of the relational source;
storing the connected results in the storage unit as reference models, each of the reference models being stored to limit a reference range of the database;
receiving from a user on a client apparatus a designation of a starting-point component information item as a reference starting point;
causing the client apparatus to display a reference model selection screen in response to the designation of the starting-point component information item from the user, the reference model selection screen containing a list of all reference models that are found in the storage unit as including a data type of the starting-point component information item;
receiving from the user a selection of a reference model in the reference model selection screen displayed on the client apparatus; and
causing the client apparatus to display a reference screen in response to the selection of the reference model from the user, the reference screen including the starting-point component information item, the reference model selected from the reference model selection screen, and a list of reference models that are found in the storage unit within a limited reference range indicated by the selected reference model from the user;
wherein the connecting includes connecting two or more connectable combinations of the reference models based on a matching result between a data type of one of the reference models located at an end and a data type included in another reference model.

2. The data reference assistant apparatus as claimed in claim 1, wherein the process further includes:
causing the client apparatus to display a search result of the data obtained from the database; and
limiting a display range of the search result on the client apparatus based on the selected reference model from the reference models stored in the storage unit.

3. The data reference assistant apparatus as claimed in claim 2, wherein the process further includes:
searching for the reference models including the data type of the starting-point component information item in the storage unit;

causing the client apparatus to display the list of the found reference models on the client apparatus; and limiting the reference range of the database by limiting a trace back range for tracing a relationship from the starting-point component information item based on the selected reference model from the list.

4. A data reference assistant method for performing a process by a computer including a processor and a storage unit storing a database which manages component information and location relation information, the processor configured to execute the process comprising:

generating data-type relation information between combinations of two data types from the component information and the location relation information which are managed in the database stored in the storage unit, the component information indicating components of data that include a data type of data, and the location relation information indicating a relational destination or a relational source between two or more of the data, for each of the data;

connecting two or more connectable combinations of the data-type relation information based on a matching result between a data type of the relational destination and a data type of the relational source;

storing the connected results in the storage unit as reference models, each of the reference models being stored to limit a reference range of the database;

receiving from a user on a client apparatus a designation of a starting-point component information item as a reference starting point;

causing the client apparatus to display a reference model selection screen in response to the designation of the starting-point component information item from the user, the reference model selection screen containing a list of all reference models that are found in the storage unit as including a data type of the starting-point component information item;

receiving from the user a selection of a reference model in the reference model selection screen displayed on the client apparatus; and causing the client apparatus to display a reference screen in response to the selection of the reference model from the user, the reference model including the starting-point component information item, the reference model selected from the reference model selection screen, and a list of reference models that are found in the storage unit within a limited reference range indicated by the selected reference model from the user;

wherein the connecting includes connecting two or more connectable combinations of the reference models based on a matching result between a data type of one of the reference models located at an end and a data type included in another reference model.

5. The data reference assistant method as claimed in claim 4, wherein the process further comprises:

causing the client apparatus to display a search result of the data obtained from the database; and limiting a display range of the search result on the client apparatus based on the selected reference model from the reference models stored in the storage unit.

6. The data reference assistant method as claimed in claim 5, wherein the process further includes:

searching for the reference models including the data type of the starting-point component information item in the storage unit;

causing the client apparatus to display the list of the found reference models on the client apparatus; and limiting the reference range of the database by limiting a trace back range for tracing a relationship from the starting-point component information item based on the selected reference model from the list.

7. A non-transitory computer-readable storage medium that stores a program which, when executed by a processor, causes the processor to perform a process comprising:

generating data-type relation information between combinations of two data types from component information and location relation information which are managed in a database stored in a storage unit, the component information indicating components of data that include a data type of data, and the location relation information indicating a relational destination or a relational source between two or more of the data, for each of the data;

connecting two or more connectable combinations of the data-type relation information based on a matching result between a data type of the relational destination and a data type of the relational source;

storing the connected results in the storage unit as reference models, each of the reference models being stored to limit a reference range of the database;

receiving from a user on a client apparatus a designation of a starting-point component information item as a reference starting point;

causing the client apparatus to display a reference model selection screen in response to the designation of the starting-point component information item from the user, the reference model selection screen containing a list of all reference models that are found in the storage unit as including a data type of the starting-point component information item;

receiving from the user a selection of a reference model in the reference model selection screen displayed on the client apparatus; and causing the client apparatus to display a reference screen in response to the selection of the reference model from the user, the reference screen including the starting-point component information item, the reference model selected from the reference model selection screen, and a list of reference models that are found in the storage unit within a limited reference range indicated by the selected reference model from the user;

wherein the connecting includes connecting two or more connectable combinations of the reference models based on a matching result between a data type of one of the reference models located at an end and a data type included in another reference model.

8. The non-transitory computer-readable storage medium as claimed in claim 7, wherein the process further comprises:

causing the client apparatus to display a search result of the data obtained from the database; and limiting a display range of the search result on the client apparatus based on the selected reference model from the reference models stored in the storage unit.

9. The non-transitory computer-readable storage medium as claimed in claim 8, wherein the process further comprises:

searching for the reference models including the data type of the starting-point component information item in the storage unit;

causing the client apparatus to display the list of the found reference models on the client apparatus; and limiting the reference range of the database by limiting a trace back range for tracing a relationship from the starting-point component information item based on the selected reference model from the list.

10. The data reference assistant apparatus as claimed in claim 1, wherein, when the database is referred to, the reference range of the database is limited to a range of data types contained in the selected reference model from the reference models stored in the storage unit.

11. The data reference assistant method as claimed in claim 4, wherein, when the database is referred to, the reference range of the database is limited to a range of data types contained in the selected reference model from the reference models stored in the storage unit.

12. The non-transitory computer-readable storage medium as claimed in claim 7, wherein, when the database is referred to, the reference range of the database is limited to a range of data types contained in the selected reference model from the reference models stored in the storage unit.

* * * * *